US009397863B2

(12) United States Patent
Gumbrell et al.

(10) Patent No.: US 9,397,863 B2
(45) Date of Patent: Jul. 19, 2016

(54) FACILITATING COMMUNICATION CONNECTIONS FOR TERMINALS HAVING TOKEN IDENTIFICATION MODULES WITHIN A TELECOMMUNICATIONS NETWORK

(71) Applicant: VODAFONE GROUP PLC, Newbury, Berkshire (GB)

(72) Inventors: Richard Gumbrell, Newbury (GB); Tony Smith, Deveon (GB); Yakeen Prabdial, London (GB); Edmund Wontner, London (GB)

(73) Assignee: VODAFONE GROUP PLC, Newbury, Berkshire (GB)

( * ) Notice: Subject to any disclaimer, the term of this patent is extended or adjusted under 35 U.S.C. 154(b) by 123 days.

(21) Appl. No.: 14/068,772

(22) Filed: Oct. 31, 2013

(65) Prior Publication Data
US 2014/0161037 A1    Jun. 12, 2014

Related U.S. Application Data

(63) Continuation of application No. 13/351,788, filed on Jan. 17, 2012, now abandoned, which is a continuation of application No. 13/117,979, filed on May 27, 2011, now abandoned, which is a continuation of application No. 12/935,798, filed as application No. PCT/GB2009/050321 on Apr. 2, 2009, now abandoned.

(51) Int. Cl.
*H04L 12/66* (2006.01)
*H04W 8/26* (2009.01)
*H04W 76/02* (2009.01)

(52) U.S. Cl.
CPC ............... *H04L 12/66* (2013.01); *H04W 8/26* (2013.01); *H04W 76/02* (2013.01)

(58) Field of Classification Search
None
See application file for complete search history.

(56) References Cited

U.S. PATENT DOCUMENTS 6,970,719 B1 * 11/2005 McConnell et al. ....... 455/554.1
7,072,354 B1    7/2006 Beathard
(Continued)

FOREIGN PATENT DOCUMENTS

| GB | 2 378 094 | 1/2003 |
|----|-----------|--------|
| GB | 2 378 095 | 1/2003 |
| GB | 2 378 097 | 1/2003 |

*Primary Examiner* — Yemane Mesfin
*Assistant Examiner* — Peter Chen
(74) *Attorney, Agent, or Firm* — B. Aaron Schulman, Esq.; Nicholas Trenkle; Stites & Harbison, PLLC (57) ABSTRACT

A cellular telecommunications network for facilitating communication connections for terminals having token identification modules, the network including: a location register for receiving requests to access the network and, if the requests are associated with a token identification module, redirecting the requests; a token register which receives redirected requests, generates connection identification data and transmits the connection identification data to the location register to identify the terminal to the location register; a network gateway component for establishing a communication between the network and the terminal in accordance with the connection identification data; and a network monitoring component for performing service management, such as a session authentication check. A network implementing the invention is capable of providing data communication sessions to terminals having identification modules that are not associated with MSISDN numbers. Embodiments described are directed to laptops and M2M terminals with embedded token identification modules.

8 Claims, 7 Drawing Sheets

(56) References Cited

U.S. PATENT DOCUMENTS

| | | | |
|---|---|---|---|
| 2002/0193100 A1* | 12/2002 | Riffe et al. | 455/417 |
| 2009/0093249 A1* | 4/2009 | Zhu | H04W 8/06 455/433 |
| 2009/0217048 A1* | 8/2009 | Smith | 713/176 |
| 2010/0136971 A1* | 6/2010 | Holter et al. | 455/435.1 |
| 2010/0223471 A1* | 9/2010 | Fresko et al. | 713/176 |
| 2011/0154022 A1* | 6/2011 | Cheng et al. | 713/154 |
| 2011/0246567 A1* | 10/2011 | Cedervall | H04N 21/4431 709/203 |
| 2012/0129492 A1* | 5/2012 | Mechaley, Jr. | G06Q 20/027 455/411 |
| 2013/0012168 A1* | 1/2013 | Rajadurai | H04L 9/0822 455/411 |

\* cited by examiner

FACILITATING COMMUNICATION CONNECTIONS FOR TERMINALS HAVING TOKEN IDENTIFICATION MODULES WITHIN A TELECOMMUNICATIONS NETWORK

CROSS-REFERENCE TO RELATED APPLICATIONS

This application is a continuation of U.S. application Ser. No. 13/351,788, filed Jan. 17, 2012, which is a continuation of U.S. application Ser. No. 13/117,979, filed May 27, 2011, which is a continuation of U.S. application Ser. No. 12/935,798, filed Sep. 30, 2010, which is a 371 application of PCT/GB2009/50321, filed Apr. 2, 2009, all of said applications incorporated herein by reference.

FIELD OF THE INVENTION

The present invention relates to a telecommunications network. In particular, the invention relates to a cellular network that allows terminals having identification modules to establish a data communication without that identification module being associated with a subscriber.

BACKGROUND OF THE INVENTION

In conventional cellular telecommunications networks, the activation of a subscriber identification module (SIM) requires that certain preconditions are met. Of particular interest here, the SIM must be associated with a unique telephone number (MSISDN). This familiar telephone number is generally used by a calling party wishing to make a voice (or video) call to the mobile terminal into which the SIM has been inserted. Invariably, the telephone number is selected (either automatically or in some instances by the user themselves) from a range of available MSISDN numbers owned by the provisioning operating company and the selected number is assigned to the SIM when the SIM is addressed for the first time by the operating company network: generally this means that the telephone number must be assigned before a user first activates the SIM under a prepay or contract arrangement.

The network operator bears a cost associated with provisioning a SIM with a valid MSISDN, both for the reservation of the MSISDN (regulators such as the ITU assign ranges of MSISDN numbers to operating companies) and for the retail staff time and overheads in registering the selected number for use.

Where that SIM appears no longer (or never to have been) used for a predetermined period, the network operators typically note this fact and initiate a "quarantine" process for returning the telephone number to the set of available numbers. Of course, this quarantining process has an associated cost: so too does reassigning that MSISDN number as ultimately will happen when it is confirmed unused after the quarantine period expires.

As the reader will readily appreciate, the provisioning of SIMs that are infrequently or never used represents a distinct inconvenience to the network operator. This inconvenience is significant even when considering the conventional provision of mobile telephones and data card/modems with SIMs. There is however a current trend to embed or otherwise SIM-enable a far wider range of computing and other electronic goods. For example, PC laptops, ultra-mobile PCs (UMPC), personal digital assistants (PDA), satellite positioning devices, set top boxes (STB), wireless access points (APs) and even onboard vehicle computers may, and lately often are, fitted with modules that accept SIMs to enable communication over cellular telecommunication networks. Clearly, this trend implies a concomitant increase in the number of unused or infrequently used SIMs and a consequently greater level of disruption to the network operator who wishes to enable such devices.

A further problem arises in relation to the production and management of SIM cards for telematics terminals (e.g. in-car computers), where it is desirable that the terminals may be exported to a variety of geographical locations each with their own telecommunication network.

As described in prior patents GB2378097, GB2378094 and GB2378095, the problem may be addressed by ensuring that all relevant operator keys and specific parameters are pre-stored on the SIM, at the time of manufacture. Consequently, a suitably prepared SIM can be re-registered from one home network to another home network as necessary. The SIM is sent instructions regarding which authentication keys it is to use in which territory and a corresponding new SIM identifier number, IMSI.

As a result, where cars are exported, SIMs can be configured for the country of manufacture and later reconfigured for the final country. The method can also apply to other devices and can be indefinitely re-configured. Hence a terminal can be used in another network (not as a roaming subscriber) for a significant time without a new SIM card being issued. Clearly the non- or infrequent use of such "prefitted" SIMs would only amplify the problems outlined above, since this solution requires the provisioning of a plurality of available MSISDNs, one for each territory envisaged at manufacture.

SUMMARY OF THE INVENTION

It is therefore an object of the invention to obviate or at least mitigate the aforementioned problems.

In accordance with one aspect of the present invention, there is provided a cellular telecommunications network for facilitating communication connections for terminals having token identification modules, the network including:

a location register for receiving requests to access the network and, if the requests are associated with a token identification module, redirecting the requests;

a token register which receives redirected requests, generates connection identification data and transmits the connection identification data to the location register to identify the terminal to the location register;

a network gateway component for establishing a communication between the network and the terminal in accordance with the connection identification data;

a network gateway component for establishing a communication between the network and the terminal in accordance with the token connection identification data; and a network monitoring component for performing service management.

The communication connections are preferably data-only communication connections.

Each request to access the network from a terminal having token identification module preferably includes an IMSI number identifying the token identification module uniquely.

The network may further include: a server which is adapted to serve user dialog webpages to terminals in accordance with token connection identification data, each webpage presenting the user with at least one user action option; and an internetwork gateway which governs access from the cellular network to an internetwork; wherein the session authentication check performed by the network monitoring component includes determining whether the token connection identification data is associated with a valid session; wherein the network gateway component directs the terminal to a user dialog webpage served by the web server when the network monitoring component determines that there is no valid associated session, and wherein the terminal is given access to the internetwork in dependence upon user action option input from the terminal.

Alternatively the network further includes an internetwork gateway which governs access from the cellular network to an M2M server via an internetwork; the session authentication check performed by the network monitoring component includes determining whether the token connection identification data is associated with a valid M2M session; and the network monitoring component directs the terminal to the M2M server when the network monitoring component determines that the token connection identification data is associated with a valid M2M session.

The internetwork may be the Internet or an intranet.

The location register may be distributed having an aggregator point for aggregating signalling functionality and a network entity for carrying out further location register functionality, said aggregator point and said network entity being in communication with one another. Examples of further location register functionality include the temporary storage of IMSI numbers.

Examples of service management performed by the network monitoring component include: session management; session authentication checking; and/or the application of network operator policy (such as fair usage).

In accordance with another aspect of the present invention, there is provided a method for facilitating communication connections between terminals having token identification modules and a cellular telecommunications network, the cellular network including a location register, a token register, a network gateway component, a network monitoring component, a server and an internetwork gateway; the method including:

at the location register, receiving a request to access the network from a terminal, determining whether the request is associated with a token identification module and redirecting the request to the token register;

at the token register, receiving the redirected request, generating token connection identification data and transmitting the connection identification data to the location register thereby identifying the terminal to the location register;

establishing a communication between the network and the terminal in accordance with the token connection identification data; and performing a session authentication check.

The session authentication check step may include determining whether the token connection identification data is associated with a valid session and the method may further include: serving a user dialog webpage to the terminal in accordance with the token connection identification data, the webpage presenting the user with at least one user action option; directing the terminal to the user dialog webpage when the network monitoring component determines that there is no valid associated session; and permitting access from the cellular network to the internetwork in dependence upon user action option input from the terminal.

Alternatively, the method may further include: directing the terminal to the M2M server when the network monitoring component determines that the token connection identification data is associated with a valid M2M session, where the internetwork gateway governs access from the cellular network to an M2M server via an internetwork and the session authentication check step includes determining whether the token connection identification data is associated with a valid M2M session.

BRIEF DESCRIPTION OF THE DRAWING FIGURES

For a better understanding of the present invention, reference will now be made, by way of example only, to the accompanying drawings in which:—

DETAILED DESCRIPTION OF THE PREFERRED EMBODIMENTS

Figure 1:
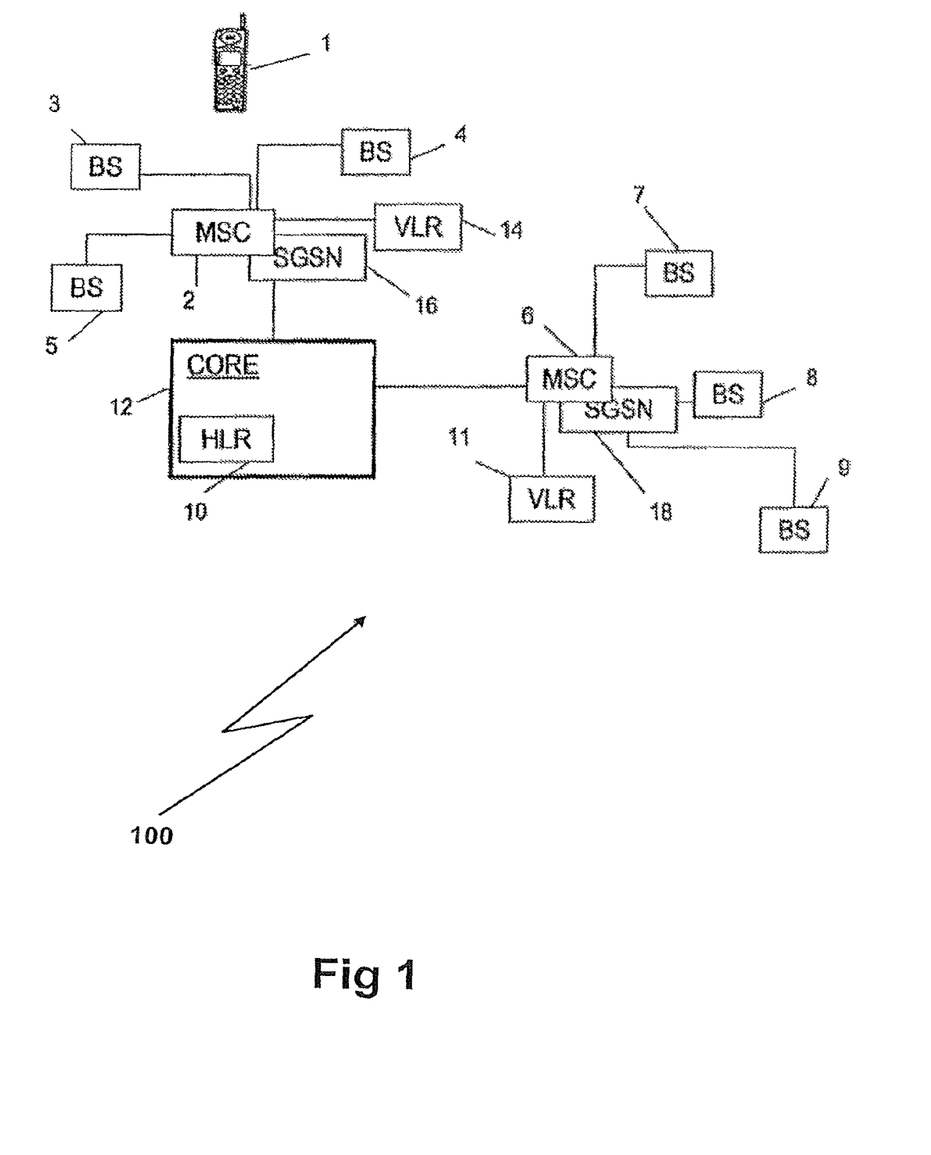
FIG. 1 illustrates key elements of a cellular telecommunications network, and its operation.

A telecommunications network 100 includes a plurality of base stations (BS) 3, 4, 5, 7, 8, and 9 and a core network 12.

Each base station (BS) corresponds to a respective cell of the telecommunications network and receives calls from and transmits calls to a mobile terminal in that cell by wireless radio communication in one or both of the circuit switched or packet switched domains. Such a subscriber's mobile terminal is shown at 1. The mobile terminal may be a handheld mobile telephone, a personal digital assistant (PDA) or a laptop computer equipped with a datacard.

Each base station comprises a base transceiver station (BTS) and a base station controller (BSC). A BSC may control more than one BTS. The BTSs and BSCs comprise the radio access network.

Conventionally, the base stations are arranged in groups and each group of base stations is controlled by one mobile switching centre (MSC), such as MSC 2 for base stations 3, 4 and 5. As shown in FIG. 1, the network has another MSC 6, which is controlling a further three base stations 7, 8 and 9. In practice, the network will incorporate many more MSCs and base stations than shown in FIG. 1.

Each subscriber to the network is provided with at least one smart card or subscriber identity module (SIM) card (strictly speaking a UICC) which, when associated with the user's mobile terminal identifies the subscriber to the network. The terminal typically has an identifier of its own (the "International Mobile Equipment Identity", IMEI), which can be obtained in certain networks, however this terminal ID is not essential in identifying the subscriber to the network. The SIM card is preprogrammed with a unique identification number, the "International Mobile Subscriber Identity" (IMSI) which can be accessed on the card but which is not generally known to (or used directly by) the subscriber. Printed on the outside of each SIM, there is a further unique identification number, the ICCID/SIM Serial number (SSN), which is unrelated to the IMSI number. The subscriber is issued with a further, publicly known, number, that is, the subscriber's telephone number, by means of which calls to the subscriber are initiated by callers. This number is the Mobile Subscriber ISDN Number (MSISDN).

The core network includes a home location register (HLR) 10 which, for each subscriber to the network, stores the IMSI and the corresponding MSISDN together with other subscriber data, such as the current or last known location of the subscriber's mobile terminal. A second register, the visitor location register (VLR) 14, is used to store the IMSI and the corresponding MSISDN for subscribers that are active in the network temporarily. Throughout the present description, the term "location register" should be understood to relate to a network entity performing the functionality of a HLR, a VLR and/or a network gateway component, such as a serving GPRS support node (SGSN).

When the subscriber wishes to activate their mobile terminal in the network (so that it may make or receive calls subsequently), the subscriber places their SIM card in a card reader associated with the mobile terminal (terminal 1 in this example).

When the mobile terminal 1 is switched on, it searches for a mobile network to which to connect. Once the mobile terminal identifies the desired network, it sends a message to the network (via the base station 3 associated with the particular cell of that network in which the terminal 1 is located) to indicate that it has entered into "idle state". This message includes the IMSI (read from the card). In a conventional network, the base station 3 then transmits the IMSI to the MSC 2 with which the BS 3 is registered.

The MSC 2 passes the IMSI to the VLR 14, which in turn checks its database to determine whether there is an existing record of the particular subscriber.

If no record is found, the VLR 14 indicates this to the MSC 2 and the MSC 2 accesses the appropriate location in the HLR 10 present in the network core 12. The MSC 2 then extracts the corresponding subscriber MSISDN and other subscriber data from the appropriate storage location, and stores it temporarily in a location in the VLR 14. Then an acknowledge message is sent to the mobile terminal. In this way, therefore the newly active subscriber is effectively registered with a particular MSC (MSC 2), and the subscriber's information is temporarily stored in the VLR (VLR 14) associated with that MSC.

When the HLR 10 is interrogated by the MSC 2 in the manner described above, the HLR 10 additionally performs an authentication procedure for the mobile terminal 1. The HLR 10 transmits authentication data to the MSC 2 in "challenge" and "response" forms. Using this data, MSC 2 passes a "challenge" to the mobile terminal 1 through base station 3. Upon receipt of this data, the mobile terminal 1 passes this data to its SIM and produces a "response". This response is generated using an encryption algorithm on the SIM and a unique key, Ki, on the SIM. The response is transmitted back to the MSC 2 which checks it against information that it has obtained for that subscriber from the HLR 10 in order to complete the authentication process. If the response from the mobile terminal 1 is as expected, the mobile terminal 1 is deemed authenticated. At this point the MSC 2 requests subscription data from the HLR 10. The HLR 10 then passes the subscription data to the VLR 14.

The authentication process will be repeated at regular intervals while the mobile terminal 1 remains activated and can also be repeated each time the mobile terminal makes or receives a call, if required (this process is known as "paging").

Each of the MSCs of the network (MSC 2 and MSC 6) has a respective VLR (14 and 11) associated with it and operates in the same way as already described when a subscriber activates a mobile terminal in one of the cells corresponding to one of the base stations controlled by that MSC.

When the subscriber using mobile terminal 1 wishes to make a voice call, having already inserted the SIM card into the reader associated with this mobile terminal and the SIM has been authenticated in the manner described, a call may be made by entering the telephone number (MSISDN) of the called party in the usual way. This information is received by the base station 3 and is then routed to the called party via the MSC 2. By means of the information held in the VLR 14, MSC 6 can associate the call with a particular subscriber and thus record information for charging purposes.

The MSCs 2 and 6 support communications in the circuit switched domain—typically voice calls. Corresponding SGSNs 16 and 18 are provided to support communications in the packet switched domain—such as GPRS data transmissions. The SGSNs 16 and 18 function in an analogous way to the MSCs 2 and 6. The SGSNs 16, 18 are equipped with an equivalent to the VLR for the packet switched domain.

FIGS. 2A, 2B, 2C and 2D show a number of alternative cellular network arrangements suitable for allowing data communication between a mobile terminal and the network in accordance with the invention. Where components are substantially identical to components shown in FIG. 1, the same reference numerals are adopted in FIGS. 2A, 2B, 2C and 2D.

In the invention, identification modules are treated as unique tokens that have not yet been associated with a particular subscriber: they are consequently referred to a token identification modules, or TIMs. Typically, a TIM card has the same form factor as a SIM card and is interchangeable therewith. Just like SIM cards, TIMs are preprogrammed with at least one unique identification number, the "International Mobile Subscriber Identity" (IMSI) which is accessible on the card. The TIM is however not associated with a publicly known number (i.e. a MSISDN). In this sense, the TIM is considered to be an "unprovisioned" SIM.

As TIMs have no MSISDN associated with them, they can be used in environments where it is uncertain when any given TIM will be used or indeed whether that TIM will be used at all. This is commercially important in typical cellular networks where there is a cost associated with provisioning a SIM with a valid MSISDN and a further cost associated with quarantining and ultimately reassigning that MSISDN number when it is unused for a predetermined period (typically of the order of six to nine months).

Figure 2A:
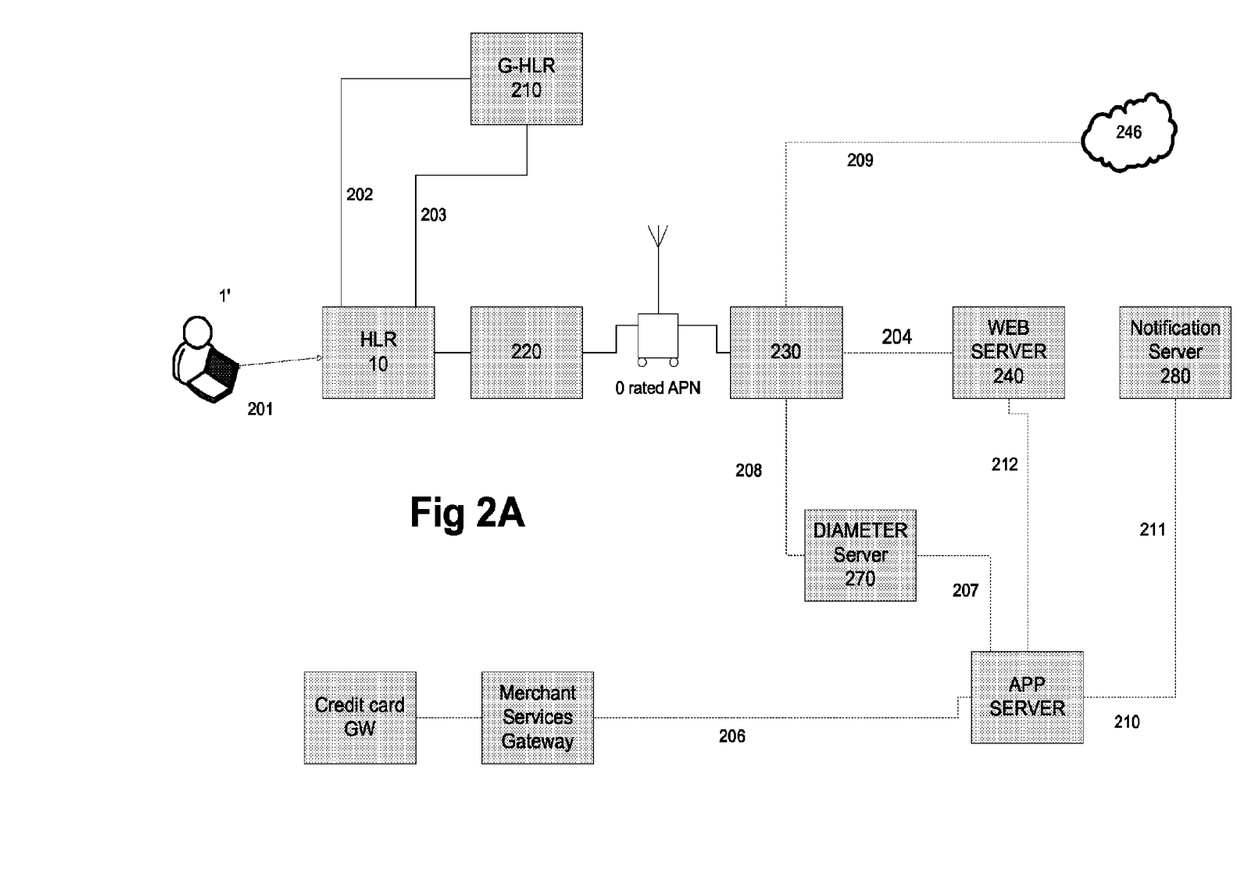
FIG. 2A illustrates key elements of a cellular telecommunications network in accordance with the invention, the network having both a home location register and a token register.

To handle the initial requests for a connection to the network, the network of FIG. 2A includes both a home location register (HLR) 10 (identical to that in the FIG. 1 network) and a global HLR (G-HLR) 210.

Figure 2B:
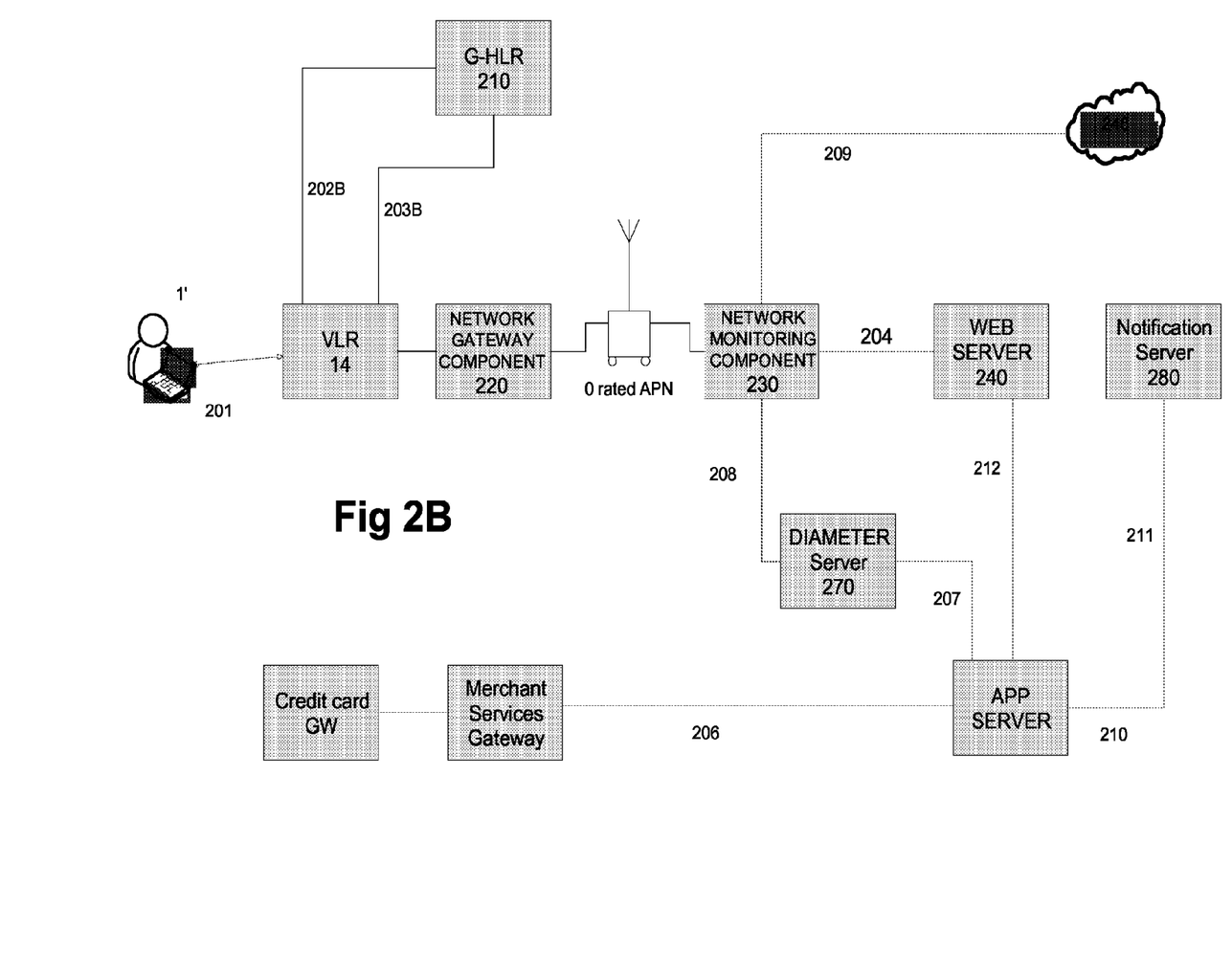
FIG. 2B illustrates key elements of an alternative cellular telecommunications network in accordance with the invention, the network having no home location register and relying upon a visitor location register instead.

In an alternative implementation, illustrated in FIG. 2B, the base stations 3,4,5,7,8 and 9; MSCs 2, 6; VLRs 11, 14; and SGSNs of FIG. 1 are linked to a global HLR (G-HLR) 210, however no HLR 10 is required.

When the user of the mobile terminal 1' wishes to activate their mobile terminal in the network (so that it may open a data connection subsequently), the user places a TIM card in a card reader associated with the mobile terminal (terminal 1' in FIGS. 2A, 2B, 2C and 2D). The mobile terminal 1' then connects to the radio network (step 201).

As for FIG. 1, connection to the radio network in FIG. 2A amounts to a request from the TIM to access the appropriate location in the HLR 10 for the transmitted IMSI number from the appropriate storage location. The HLR 10 determines that the IMSI number provided by the TIM belongs to another register. The request for connection is then forwarded to the G-HLR 210 (step 202). The G-HLR 210 then extracts the IMSI number from this request and, assuming the IMSI number is in a range maintained by the G-HLR 210, transmits a token signal to the HLR 10 (step 203) that the IMSI has been recognised by the G-HLR 210 (this token signal may simply be a confirmation signal (OK') but it may include further profile information).

Connection to the radio network in FIG. 2B, by contrast, amounts to a request to access the appropriate home location in the VLR 14 for the transmitted IMSI number from the appropriate storage location. The VLR 14 determines, by IMSI number analysis, that the TIM belongs to another register. The request for connection is then forwarded to the G-HLR 210 (step 202B). The G-HLR 210 then extracts the IMSI number from this request and, assuming the IMSI number is in a range maintained by the G-HLR 210, transmits a token signal to the VLR 14 (step 203B) that the IMSI has been recognised by the G-HLR 210 (this token signal may simply be a confirmation signal (OK') but it may include further profile information).

Figure 2C:
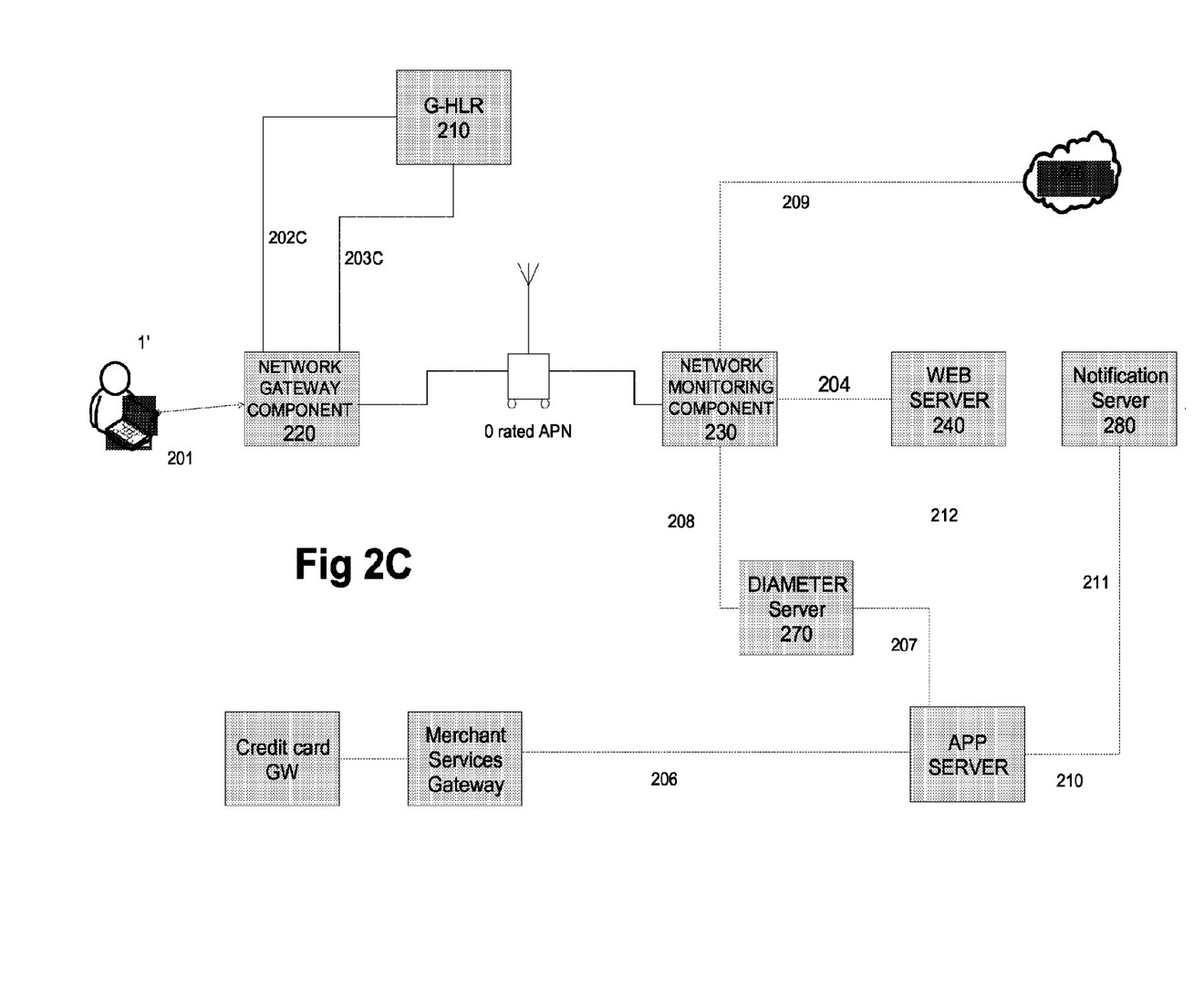
FIG. 2C illustrates key elements of a further alternative cellular telecommunications network in accordance with the invention, the network relying upon location register functionality in a network gateway component instead of home location register.

Likewise, connection to the radio network in FIG. 2C, amounts to a request to access the appropriate home location in the SGSN for the transmitted IMSI number from the appropriate storage location. The SGSN determines, by IMSI number analysis, that the TIM belongs to another register. The request for connection is then forwarded to the G-HLR 210 (step 202C). The G-HLR 210 then extracts the IMSI number from this request and, assuming the IMSI number is in a range maintained by the G-HLR 210, transmits a token signal to the SGSN (step 203C) that the IMSI has been recognised by the G-HLR 210 (this token signal may simply be a confirmation signal (OK') but it may include further profile information).

Figure 2D:
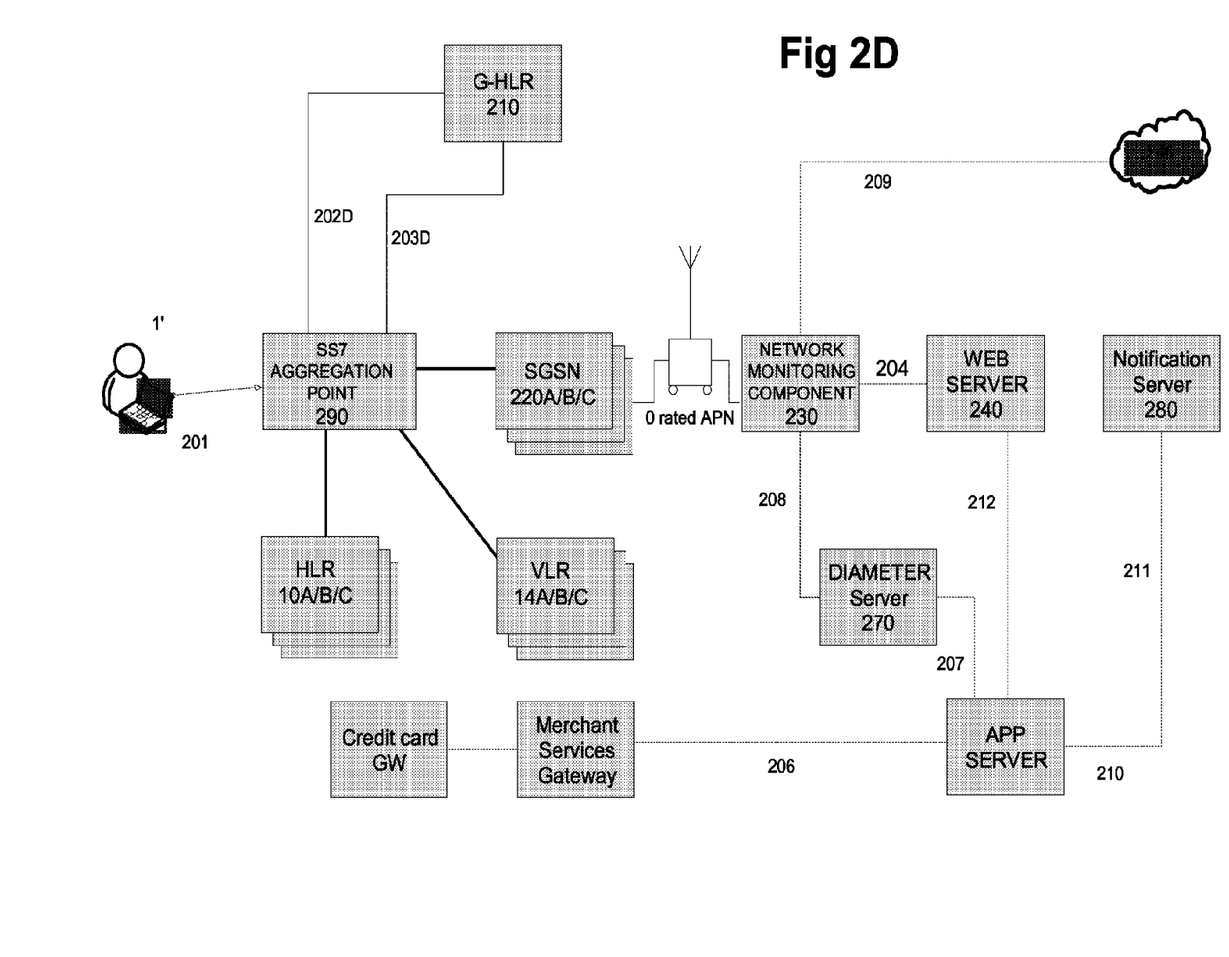
FIG. 2D illustrates key elements of yet further alternative cellular telecommunications networks in accordance with the invention, in which an SS7 aggregation point is used to facilitate the architectures of FIGS. 2 A, 2B and 2C.

FIG. 2D illustrates a different mechanism for handling such requests for connection to the radio network in which an SS7 aggregator point 290 (such as an SS7 Signalling Connection Control Part (SCCP) Relay or Signalling Transfer Point (STP)) is used to aggregate the SS7 functionality. In particular, the SS7 aggregator point may perform IMSI analysis (e.g. Global Title Translation (GTT) capabilities for the IMSI address type), eliminating the need to continually manage the routing tables within MSCs (Mobile Switching Centre) and/or the SGSN 220.

The HLR 10, upon receipt of the token signal, stores the IMSI temporarily in a location in the visitor location register (VLR) 14. In the FIG. 2B alternative, the VLR 14 stores the IMSI temporarily in a VLR location register store. In this way, therefore the user of the terminal 1' is effectively registered with a particular MSC (MSC 2), and any profile information associated with the TIM is temporarily stored in the VLR (VLR 14) associated with that MSC.

In the FIG. 2C alternative, the SGSN stores the IMSI temporarily in an SGSN location register store. The user of the terminal 1' is then effectively registered with a particular SGSN (bypassing the VLR altogether), and any profile information associated with the TIM is temporarily stored in the SGSN location register store.

Once the above steps have been completed, an authentication procedure is then performed for the mobile terminal 1'. For FIGS. 2A and 2B, the G-HLR 210 transmits authentication data to the MSC 2 in "challenge" and "response" forms. Using this data, MSC 2 passes a "challenge" to the mobile terminal 1' through base station 3. Upon receipt of this data, the mobile terminal 1' passes this data to its TIM and produces a "response". This response is generated using an encryption algorithm on the TIM and a unique key, Ki', on the TIM. The response is transmitted back to the MSC 2 which checks it against information that it has obtained for that token from the G-HLR 210 in order to complete the authentication process. If the response from the mobile terminal 1' is as expected, the mobile terminal 1' is deemed authenticated.

For FIG. 2C too, the G-HLR 210 transmits authentication data to the SGSN 220 in "challenge" and "response" forms. Here, the SGSN 220 uses this data to pass a "challenge" to the mobile terminal 1' through base station 3. Upon receipt of this data, the mobile terminal 1' passes this data to its TIM and produces a "response". This response is generated using an encryption algorithm on the TIM and a unique key, Ki', on the TIM. The response is transmitted back to the SGSN 220 which checks it against information that it has obtained for that token from the G-HLR 210 in order to complete the authentication process. If the response from the mobile terminal 1' is as expected, the mobile terminal 1' is deemed authenticated.

As the reader will readily appreciate, the use of an SS7 aggregator point 290 to aggregate SS7 functionality (as illustrated in FIG. 2D) can be combined with the mechanisms for performing authentication described above whether the authentication is performed via MSC 2 or SGSN 220.

The authentication process will be repeated at regular intervals while the mobile terminal 1' remains activated and can also be repeated each time the mobile terminal makes or receives a call, if required.

When the user of mobile terminal 1' wishes to establish a data connection, having already inserted the TIM card into the reader associated with this mobile terminal and the validity of the TIM has been confirmed by the G-HLR 210 in the manner described, the request for a data connection is passed to a network gateway component 220 (i.e. SGSN 16) and a gateway session is established.

The network gateway component 220 receives from the G-HLR 210 a key corresponding to the IMSI. This key is used, in turn, to query a network monitoring component 230 (e.g. NGME, or GGSN) which determines whether the key data is associated with an existing, valid session (typically a native RADIUS and/or DIAMETER session). The signalling between the network gateway component 220 and the network monitoring component 230 is preferably zero-rated so that the user is not billed for the establishment of the session.

If a valid session already does exist for this key data, the data connection is established (step 209). The mobile terminal 1' has access to a requested internetwork 246—typically the Internet or a corporate intranet.

If however no valid session can be found that corresponds to the key, the mobile terminal 1' may instead be redirected to a webpage generated by a web server 240. The webpage presented is tailored to the mobile terminal 1' in accordance with key data and offers the user at least one user action option.

The network monitoring component 230 then acts as an internetwork gateway: denying or allowing access from the cellular network 100 to the requested internetwork 246 in dependence upon the information input by the user in relation to the selected user action option. In a typical scenario, the webpage offers the option of a time-limited session for a predetermined price. The selection of that option leads the user to a user dialog requesting user billing information, including for example: name, address, credit/debit card details, voucher/coupon information, existing phone no. to which to bill/SMS etc.

Session control is provided by a session control server (preferably a native DIAMETER server). The session control server issues regular reports on the sessions it manages (so-called "event tickets"). In a native DIAMETER-based session, the network monitoring component 230 can use the DIAMETER event tickets for each valid session to monitor the session usage of each user. This may in turn be presented to the user through an application on the mobile terminal 1', so that the user may see, for instance, that usage has exceeded a prearranged threshold value. Alternatively, session usage may in turn be presented to the user through a pop-up on a web application (e.g. browser) on the mobile terminal 1'.

Since the reporting comes directly from the DIAMETER server rather than from a client-based (and inaccurate) counter application, the user is immediately presented with up-to-date session usage reporting. As the reader will appreciate this means that the user can avoid the phenomenon of "bill-shock" (when the tariff for a particular session is received (after some delay) and the user realises that the bill is a great deal higher than they understood it would be).

There are many more benefits from using a client application on the terminal to present the usage information. For example the user could be provided with a facility to record itemised logs of their usage or to request a specific quality of service level (for which a different charge could be levied and that charge in turn be monitored by the user). The operator of a cellular network could also have more latitude in services: offering, for instance, dynamic, congestion-based, charging where the cost per unit of data can be varied in accordance with the degree of data usage on the network at that instant (which the user could in turn monitor through his/her client application).

Clearly, the network monitoring component 230 can also use the DIAMETER event tickets for each valid session to monitor the session usage of groups of users (as might be required in providing services to a business or "enterprise"). This arrangement facilitates so-called "mediated billing" so that an enterprise can aggregate the bills for groups of enterprise users. Mediated billing may be effected by presenting information about monitored sessions to an administrator or agent for the enterprise through an enterprise monitoring and central billing application.

The operation of the invention may be further understood by considering two more specific embodiments. The first embodiment, illustrated in FIG. 3, relates to the processing of a request for a data session from a laptop computer with an embedded TIM. The second embodiment, illustrated in FIG. 4 concerns the processing of a request for a machine to machine data session from a machine to machine client with an embedded TIM.

Figure 3:
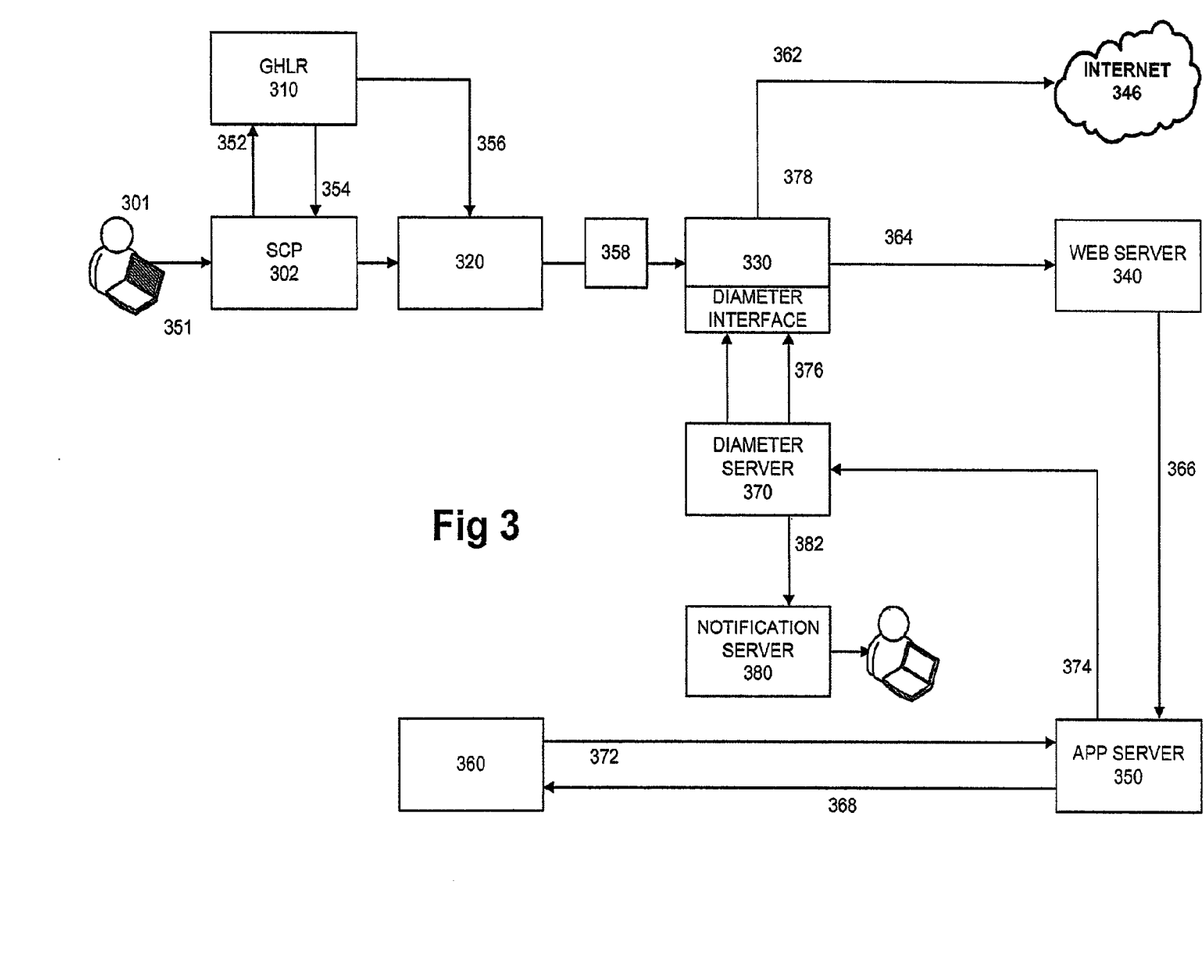
FIG. 3 illustrates the flow of events in providing data sessions to a PC laptop with an embedded identification module in accordance with the invention.

In FIG. 3, the network includes a SCP 302 and a global HLR (G-HLR) 310. The mobile terminal 301 in this case is a laptop computer with an embedded TIM. The SCP 302 may subsume the functionality of the HLR 10 in the FIG. 1 network (ensuring that connection to the radio network follows the mechanism set out in more detail in FIG. 2A). Alternatively the SCP 302 may subsume the functionality of a VLR 14 (facilitating the mechanism of FIG. 2B) and/or the functionality of an SGSN 220 (facilitating the mechanism of FIG. 2C). Clearly, the SCP 302 may also incorporate an SS7 aggregator 290 (such as an SCCP Relay) to aggregate the SS7 functionalities that would otherwise be required of the HLR 10, VLR 14 and/or the SGSN 220—thereby facilitating any one of the mechanisms represented in FIG. 2D.

When the user wishes to activate his laptop in the cellular network (so that it may open a data connection subsequently), the user "starts" a data connect application executing on the operating system of the laptop. The laptop 301 then connects to the radio network (step 351).

As for FIG. 1, connection to the radio network in FIG. 3 amounts to a request to access the appropriate location in the SCP 302 for the transmitted IMSI number from the appropriate storage location: no MSISDN has been associated with the IMSI number provided by the TIM. The SCP 302 determines that the IMSI number provided by the TIM belongs to another register. The request for connection is then redirected to the G-HLR 310 (step 352). The G-HLR 310 then extracts the IMSI number from this request and, assuming the IMSI number is in a range maintained by the G-HLR 310, transmits a token signal to the SCP 302 (step 354) that the IMSI has been recognised by the G-HLR 310 (this token signal may simply be a confirmation signal (OK') but it may include further profile information).

The SCP 302, upon receipt of the token signal, stores the IMSI temporarily (for instance in a VLR location register store or an SGSN location register store). In this way, therefore the user of the laptop 301 is effectively registered with a particular MSC or SGSN, and any profile information associated with the TIM is temporarily stored in the VLR 14 associated with that MSC 2 or SGSN 220.

The request for a data connection is passed by the SCP 302 to a network gateway component 320 (i.e. SGSN 16). The network gateway component 320 receives from the G-HLR 310 a key corresponding to the IMSI (step 356). Taking the key, together with the forwarded request for a data connection, network gateway component 320 establishes a gateway session. This key is used, in turn, to query a network monitoring component 330 (e.g. NGME, or GGSN) which determines whether the key data is associated with an existing, valid session (typically a native DIAMETER session). The signalling (step 358) between the network gateway component 320 and the network monitoring component 330 is preferably zero-rated so that the user is not billed for the establishment of the session.

If a valid session already does exist for this key data, the data connection is established (step 362). The laptop 301 has access to a requested internetwork 346-typically the Internet or a corporate intranet.

If however no valid session can be found that corresponds to the key, the laptop 301 may instead be redirected to a webpage generated by a web server 340 (step 364). The webpage presented is tailored to the laptop 301 in accordance with key data and offers the user at least one user action option.

In this case, the web server offers a "landing page" with access to a payment portal—allowing the user to purchase either a time/data limited session package or to initiate an application for a contract payment relationship with the network operator.

The user is prompted to provide personal details including their credit card details to facilitate the establishment of a data session for a predetermined price (step 366).

The user data is sent to an application server 350. This server in turn processes the credit card details of the user for authentication at a credit card server 360. Assuming the credit card details are authenticated, the credit card server 360 signals that fact (step 372) back to the application server 350.

The application server 350, now that it has authenticated credit card details for the user signals to a DIAMETER server 370 that a DIAMETER session should be initiated for this user (step 374). The DIAMETER SERVER in turn signals to the network monitoring component 330 that a session should be opened (step 376).

The network monitoring component 330 then redirects the user to the internet (step 378) and simultaneously changes the billing status of the user from zero rated to a data rate.

As the DIAMETER server 370 provides "tickets" showing session usage, this information is pushed to a notification server 380 (step 382). The notification server may either send prearranged updates as to the percentage (or absolute) usage or may respond to user (or client application) queries as to current usage status. In a preferred implementation, the notification server creates an RSS feed for each session, thereby allowing the user's laptop to monitor status using a conventional HTTP port (port 80) and avoiding any need for a customisation to the user's firewall software.

At the end of a prearranged session, the DIAMETER server 370 instructs the network monitoring component 330 to place the session on hold (and zero-rates the session). It also pushes a usage alert to the user via the notification server 380.

If the session ended because credit had expired the user need only repeat the process of requesting a further session from the landing page.

In a preferred implementation, the webpage presented to the laptop 301 offers the user a further action option of requesting that the current session-based relationship mediated by the TIM should be converted to a contract-based relationship (i.e. a so-called postpay contract). To meet this request, the network operator may simply order up and send a conventional "provisioned" SIM card to the user so that the user may physically swap the TIM out of (and the new SIM card into) the laptop's card reader. Thereafter, access to data sessions would go through the conventional event flow outlined in relation to FIG. 1.

As the reader will appreciate, there are alternative mechanisms for facilitating a swap from the TIM-enabled sessions to conventional contract data session access. The IMSI held by the TIM could, for instance, be provisioned on a given network operator's network (i.e. an MSISDN number may be associated with the IMSI). Indeed a plurality of MSISDN numbers could be provisioned to the TIM as might be necessary to effect the prior art "prefitted" SIM scenario mentioned above.

In this case, the web server offers a "landing page" with access to a payment portal—allowing the user to purchase either a time/data limited session package or to initiate an application for a contract payment relationship with the network operator.

Figure 4:
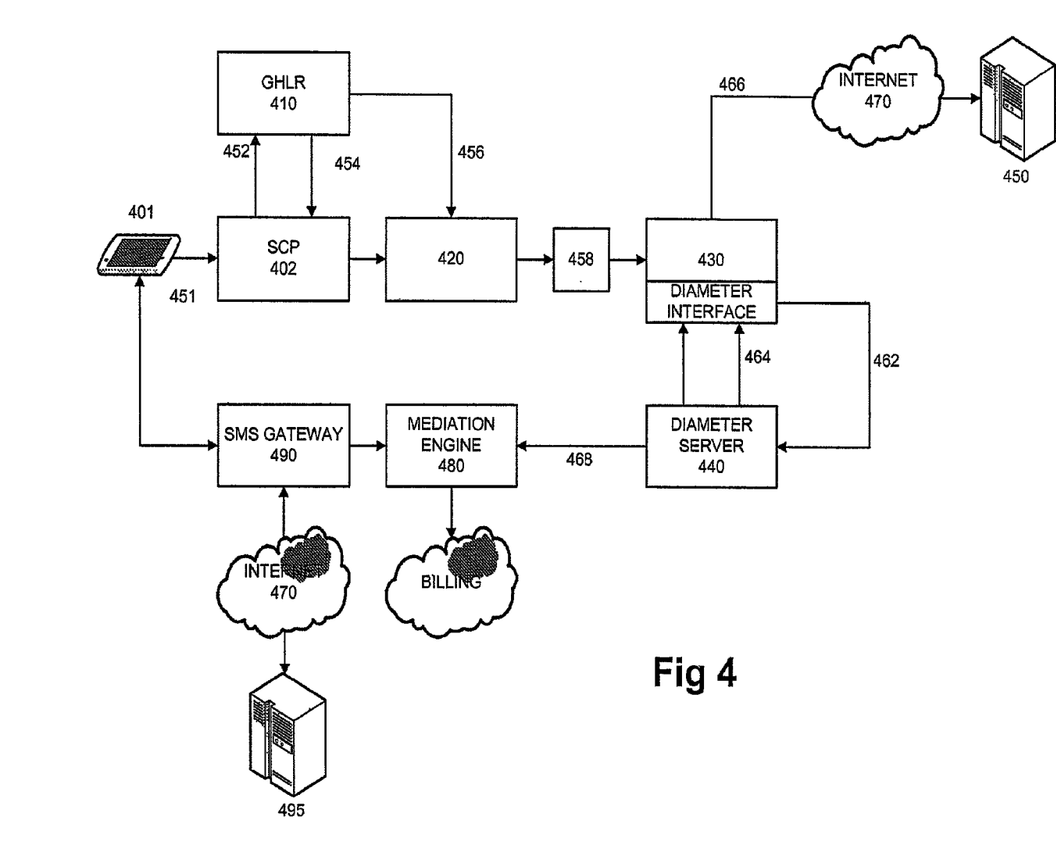
FIG. 4 illustrates the flow of events in providing data sessions to a device for use in a machine to machine environment in accordance with the invention.

The second embodiment, illustrated in FIG. 4, relates to a machine to machine implementation of the invention. The illustrated network includes a SCP 402 and a global HLR (G-HLR) 410. The terminal 401 in this case is a machine to machine (M2M) client (note that this terminal is not strictly "mobile" in many, cases—the terminal being installed at a single geographic location from which it is not typically moved) with an embedded TIM.

The SCP 402 may subsume the functionality of the HLR 10 in the FIG. 1 network (ensuring that connection to the radio network follows the mechanism set out in more detail in FIG. 2A). Alternatively the SCP 402 may subsume the functionality of a VLR 14 (facilitating the mechanism of FIG. 2B) and/or the functionality of an SGSN 220 (facilitating the mechanism of FIG. 2C). Clearly, the SCP 402 may also incorporate an SS7 aggregator 290 (such as an SCCP Relay) to aggregate the SS7 functionalities that would otherwise be required of the HLR 10, VLR 14 and/or the SGSN 220—thereby facilitating any one of the mechanisms represented in FIG. 2D.

When the M2M client 401 requires to be activated in the cellular network (so that it may open a data connection subsequently), the client "starts" a data connect application executing on its operating system, typically in response to a trigger event. The M2M client 401 then connects to the radio network (step 450).

As for FIG. 1, connection to the radio network in FIG. 4 amounts to a request to access the appropriate location in the SCP 402 for the transmitted IMSI number and to extract the corresponding subscriber MSISDN from the appropriate storage location. Since no MSISDN has been associated with the IMSI number provided by the TIM, the SCP 402 determines that the IMSI number provided by the TIM belongs to another register. The request for connection is then redirected to the G-HLR 410 (step 452). The G-HLR 410 then extracts the IMSI number from this request and, assuming the IMSI number is in a range maintained by the G-HLR 410, transmits a token signal to the SCP 402 (step 454) that the IMSI has been recognised by the G-HLR 410 (this token signal may simply be a confirmation signal (OK') but it may include further profile information).

The SCP 402, upon receipt of the token signal, stores the IMSI temporarily in a location in the visitor location register (VLR) (not shown). In this way, therefore the M2M client 401 is effectively registered with a particular MSC (not shown), and any profile information associated with the TIM is temporarily stored in the VLR associated with that MSC.

The request for a data connection is passed by the SCP 402 to a network gateway component 420 (i.e. SGSN 16). The network gateway component 420 receives from the G-HLR 410 a key corresponding to the IMSI (step 456). Taking the key, together with the forwarded request for a data connection, network gateway component 320 establishes a gateway session. This key is used, in turn, to query a network monitoring component 430 (e.g. NGME or GGSN) which determines whether the key data is associated with an existing, valid session (typically a native DIAMETER session). The signalling (step 458) between the network gateway component 420 and the network monitoring component 430 is preferably zero-rated so that the client device 401 is not billed for the establishment of the session.

Assuming that no valid session corresponding to that key exists, the network monitoring component 430 interfaces with a DIAMETER server 440 to authenticate a new M2M data session (step 462) for the M2M client 401.

The DIAMETER server 440 in turn signals to the network monitoring component 430 that a session should be opened (step 464).

The network monitoring component 430 then redirects the user to a requested M2M server 450 via a fixed-line network such as the internet 470 (step 466) and simultaneously changes the billing status of the M2M client session from zero rated to a data rate.

At the end of a prearranged session, the DIAMETER server 440 instructs the network monitoring component 430 to place the session on hold (and zero-rates the session).

The DIAMETER server 440 also pushes a usage alert (using DIAMETER tickets, step 468) to a billing mediation engine 480, which generates a billing event corresponding to the reported session usage.

As described in further detail in co-pending UK patent application GB 0815200.1, the M2M client sends and receives short text messages (SMS) to a dedicated M2M SMS platform 495. These SMS messages are transported in a conventional manner through an SMS Gateway 490 and then across an internet connection 470 to the M2M SMS platform 495.

The SMS gateway 490 also passes data relating to the transferred SMS messages to the mediation engine 480 to allow billing for this messaging.

While terminals are often referred to as "mobile" in the preceding discussion the term "mobile" should not be construed to require that a terminal always be mobile, merely that it has the capability of being in communication with a wireless telecommunications network which allows mobility. For instance, a PC terminal or an M2M client that is never moved from a particular geographic location may in this sense still be considered mobile as it could be moved to a different location yet still access the same network. Where the term "mobile terminal" is used in the present discussion it is to be read as including the possibility of a terminal that is "semi-permanent" or even "fixed" where the context does not contradict such an interpretation.

What is claimed is:

1. A system implemented within a cellular telecommunications network for facilitating data-only communication connections for terminals, the system including:
    a location register that receives requests to access the cellular network from the terminals and redirects each of the requests that is associated with a token identification module;
    a token register that receives said redirected requests and, for each redirected request to access the cellular network from any of the terminals received by the token register, generates token connection identification data for the token identification module associated with the request and transmits the token connection identification data to the location register to identify the terminal to the location register;
    a network gateway node that, for each request from any of the terminals for which the token register generates any token connection identification data, establishes a communication between the cellular network and the terminal in accordance with the token connection identification data;
    a web server that serves user dialog webpages to the terminals in accordance with any token connection identification data generated for the terminals, each user dialog webpage presenting at least one user action option;
    an internetwork gateway that governs access from the cellular network to an internetwork; and
    a network monitoring node that performs service management, the network monitoring node being configured to perform a session authentication check for any of the terminals that includes determining whether any token connection identification data generated for the terminal is associated with a valid session, and
    wherein, for each terminal for which the network monitoring node determines that there is no valid session associated with any token connection identification data generated for the terminal, the network gateway node directs the terminal to a user dialog webpage of the user dialog webpages served by the web server upon the network monitoring node determining that there is no valid session associated with the token connection identification data, and
    wherein each terminal to which the web server serves a user dialog webpage is given access to the internetwork in dependence upon input received for the at least one user action option from the terminal.

2. A system as claimed in claim 1, wherein each request to access the network received by the location register from any of the terminals that have token identification modules includes an International Mobile Subscriber Identity (IMSI) number identifying the token identification module of the terminal uniquely.

3. A system as claimed in claim 1, wherein the internetwork gateway governs access from the cellular network to a machine to machine (M2M) server via the internetwork;
    wherein the session authentication check performed by the network monitoring node for any of the terminals comprises determining whether any token connection identification data generated for the terminal is associated with a valid M2M session; and
    wherein, for each terminal for which the network monitoring node determines any token connection identification data generated for the terminal to be associated with any valid M2M session, the network monitoring node directs the terminal to the M2M server upon the network monitoring node determining that the token connection identification data generated for the terminal is associated with the valid M2M session.

4. A system as claimed in claim 1 wherein the internetwork is the Internet.

5. A system as claimed in claim 1 wherein the internetwork is an intranet.

6. A system as claimed in claim 1, wherein the location register is distributed having an aggregator point for aggregating signalling functionality and a network entity for carrying out further location register functionality, said aggregator point and said network entity being in communication with one another.

7. A method for facilitating data-only communication connections between terminals having token identification modules and a cellular telecommunications network via a system implemented within the cellular network that includes a location register, a token register, a network gateway node, a network monitoring a node, a server, and an internetwork gateway that governs access from the cellular network to an internetwork, the method comprising:
    at the location register, receiving a request to access the network from a terminal, determining whether the request is associated with a token identification module, and redirecting the request to the token register;
    at the token register, receiving the redirected request, generating token connection identification data, and transmitting the token connection identification data to the location register thereby identifying the terminal to the location register;
    establishing a communication between the network and the terminal in accordance with the token connection identification data; and
    performing a session authentication check that includes determining whether the token connection identification data is associated with a valid session;
    directing the terminal to a user dialog webpage that presents at least one user action option upon a determination that there is no valid session associated with the token connection identification data;
    serving the user dialog webpage to the terminal in accordance with the token connection identification data; and
    permitting the terminal to access the internetwork from the cellular network in dependence upon input received for the at least one user action option from the terminal.

8. A method as claimed in claim 7, wherein the internetwork gateway governs access from the cellular network to a machine to machine (M2M) server via the internetwork, wherein the session authentication check further includes determining whether the token connection identification data is associated with a valid M2M session and wherein the method further comprises directing the terminal to the M2M server upon a determination that the token connection identification data is associated with a valid M2M session.

* * * * *